(12) United States Patent
Chepurny et al.

(10) Patent No.: US 8,985,658 B2
(45) Date of Patent: Mar. 24, 2015

(54) CARABINER AND CONNECTION TOOL FOR USE WITH PATIENT CARRYING SYSTEMS

(75) Inventors: Mark Chepurny, Bradford (CA); Mikel Shani, Mississauga (CA)

(73) Assignee: Prism Medical Ltd., Mississauga, Ontario (CA)

( * ) Notice: Subject to any disclaimer, the term of this patent is extended or adjusted under 35 U.S.C. 154(b) by 2099 days.

(21) Appl. No.: 11/791,916

(22) PCT Filed: Dec. 2, 2005

(86) PCT No.: PCT/CA2005/001842
§ 371 (c)(1),
(2), (4) Date: May 30, 2007

(87) PCT Pub. No.: WO2006/058438
PCT Pub. Date: Jun. 8, 2006

(65) Prior Publication Data
US 2008/0222859 A1      Sep. 18, 2008

(30) Foreign Application Priority Data

Dec. 2, 2004   (CA) ...................................... 2489047

(51) Int. Cl.
*F16B 45/02*    (2006.01)
*A61G 7/10*    (2006.01)

(52) U.S. Cl.
CPC ............... *F16B 45/02* (2013.01); *A61G 7/1015* (2013.01); *A61G 7/1042* (2013.01); *A61G 7/1051* (2013.01); *A61G 7/1061* (2013.01); *A61G 7/1065* (2013.01); *A61G 7/1069* (2013.01); *A61G 2200/34* (2013.01); *A61G 2203/78* (2013.01)

USPC ....... 294/209; 294/211; 294/82.24; 24/599.1; 24/599.2; 5/81.1 R

(58) Field of Classification Search
USPC .......... 294/19.1, 209, 210, 211, 82.24, 82.25, 294/82.19; 24/599.1, 599.2, 599.5, 599.6, 24/600.2, 600.7; 5/81.1 R, 83.1, 85.1
See application file for complete search history.

(56) References Cited

U.S. PATENT DOCUMENTS

| | | | | |
|---|---|---|---|---|
| 184,709 | A | * | 11/1876 | Haines .......................... 24/599.9 |
| 621,295 | A | * | 3/1899 | Curtis ........................... 24/599.6 |
| 691,630 | A | * | 1/1902 | Huberdeau ................... 24/599.6 |
| 1,010,952 | A | | 12/1911 | Purves |
| 1,576,352 | A | | 3/1926 | Nordling |
| 2,705,357 | A | | 4/1955 | Davick |
| 4,372,452 | A | | 2/1983 | McCord |
| 4,411,050 | A | * | 10/1983 | Couture ........................ 24/599.4 |
| 4,765,667 | A | | 8/1988 | Hamrin |
| 5,210,914 | A | * | 5/1993 | Katsma ........................ 24/599.6 |

(Continued)

FOREIGN PATENT DOCUMENTS

EP           0561751         12/1997

*Primary Examiner* — Paul T Chin
(74) *Attorney, Agent, or Firm* — The Webb Law Firm

(57) ABSTRACT

A carabiner comprising a body having an opening, a closure movably coupled to the body, the closure being movable to an open position, and to a closed position in which the opening is closed by the closure such that the body and the closure define a closed shape, and an actuator, coupled to the closure and operatively connected to the body, the actuator being configured to cause the closure to move to the closed position in response to loading of the carabiner, and to cause the closure to move from the closed position to the open position in response to unloading of the carabiner.

19 Claims, 8 Drawing Sheets

(56) References Cited

U.S. PATENT DOCUMENTS

| | | |
|---|---|---|
| 5,398,825 A | 3/1995 | Erwin |
| 5,416,955 A | 5/1995 | Katsma |
| 5,791,025 A | 8/1998 | Maurice et al. |
| 5,899,512 A | 5/1999 | Wiklund |
| 6,283,524 B1 | 9/2001 | Simond |
| 6,561,313 B2 | 5/2003 | Hewlett et al. |
| 2008/0083100 A1* | 4/2008 | Beed .......................... 24/599.1 |

* cited by examiner

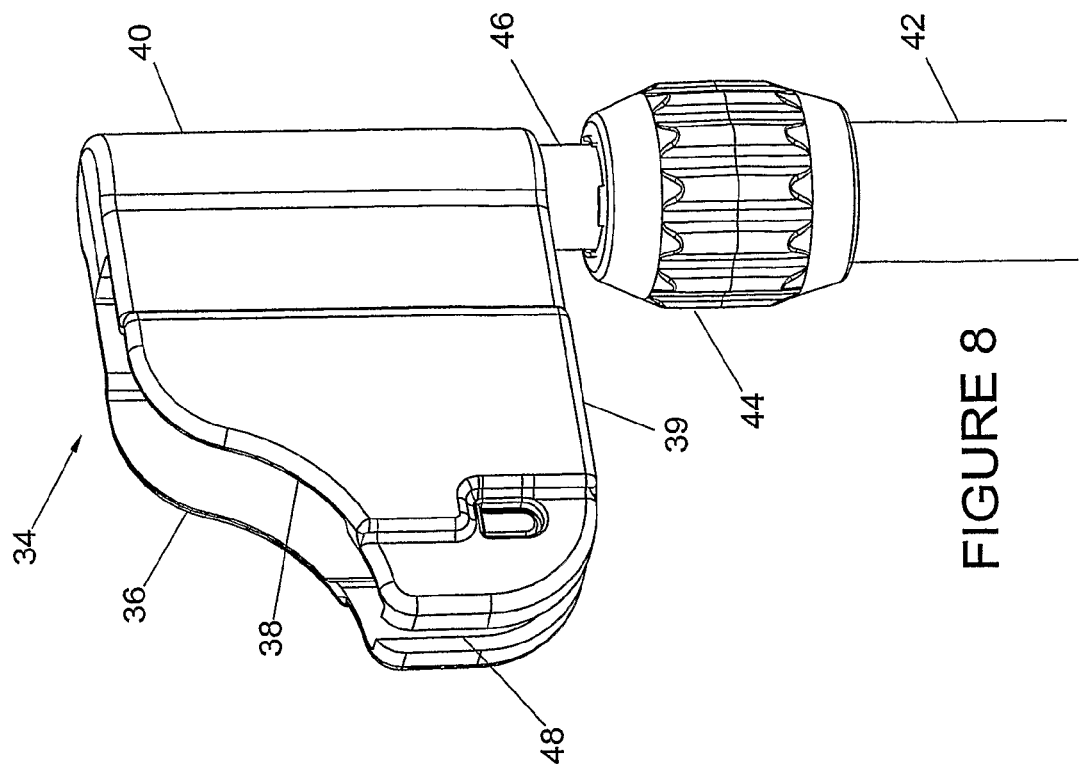
FIGURE 8
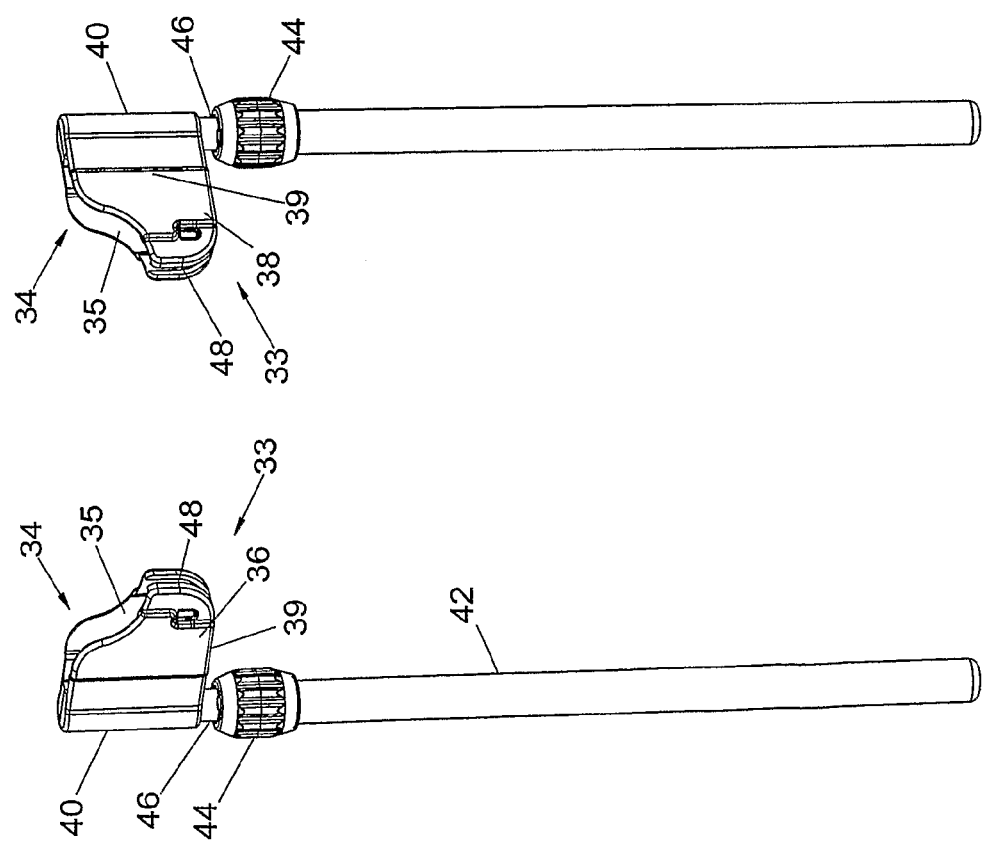
FIGURE 7
FIGURE 6

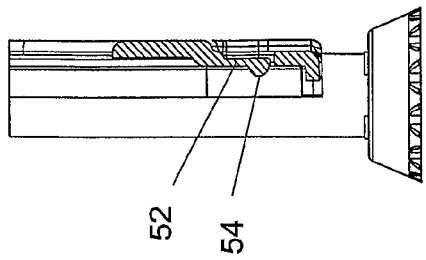
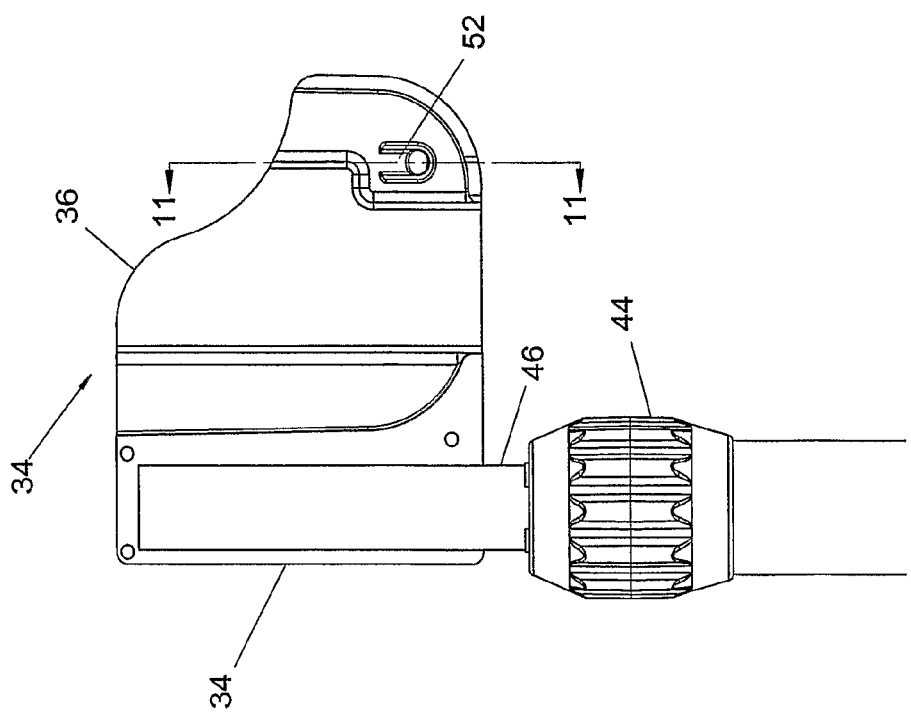

CARABINER AND CONNECTION TOOL FOR USE WITH PATIENT CARRYING SYSTEMS

FIELD OF THE INVENTION

This invention relates to the field of medical care for patients that are bedridden or otherwise have difficulty moving on their own. In particular, this invention relates to the field of patient-carrying devices.

BACKGROUND OF THE INVENTION

Bedridden patients generally require highly focused and specialized medical care. As such patients are typically unable to move on their own, caring for them usually involves the use of patient-carrying devices. A common type of patient-carrying device is a portable system with a support frame that supports an overhead rail with a trolley movably mounted thereto. The patient is placed in a harness, which harness is connected to a loop or eye-bolt depending from the trolley. The patient is lifted, and then moved by the caregiver along the overhead track. In this way, the patient can be moved from one location to another (e.g. from bed to a wheelchair, or from a wheelchair to the toilet).

Typically, the patient harness is coupled to a loop or eye-bolt depending from the track. It is common for the overhead track to be so high above the floor that the loop is not reachable by hand. Therefore, typically, a reaching tool is used to connect the harness with the loop. A typical reaching tool consists of a handle fixedly attached to a hook from which the strap for the harness depends. Once the hook is hooked onto the loop, the patient is moved with the handle still attached to the hook.

This configuration presents a number of problems. First, the elongate handle of the reaching tool remains attached to the harness strap while the patient-carrying device is in use. This presents safety concerns, because it is possible for the caregiver to be struck by the handle as the trolley is moved. In addition, the elongate handle can easily strike walls or furniture as the trolley is moved, thus causing damage and inconvenience.

In addition, the prior art hook that connects to the loop is typically a fixed open hook. Such hooks are used because, since the loop is typically out of reach, and the reaching tool must be used, the hook can only be anchored to and unanchored from the loop if the hook is an open hook. However, regulations in many jurisdictions require that any hook or carabiner used in the carrying of patients must form a closed shape, to ensure that the hook does not slip off and cause the patient to fall.

U.S. Pat. No. 5,416,955 ("Katsma") discloses a carabiner for use by mountain climbers. The carabiner includes a body and a latch, as well as a trigger. The trigger forces the latch to a closed position in response to loading. Absent a load, there is a biasing element that biases the latch to an open position when the latch is at least three quarters open, and otherwise biases the latch to a closed position. Thus, the biasing element is bidirectional, urging the latch in different directions depending on the latch's position.

The trigger and biasing element are positioned at the top of the carabiner and thus distal from the load (typically the climber or his pack) positioned below the carabiner. The trigger is actuated by the connector connecting the carabiner to the object above it.

The carabiner of Katsma, however, does not solve the problems described above. For example, the carabiner of Katsma, once closed, must be pushed open by hand in order to overcome the biasing element. However, as explained above, the loops to which patients are typically attached often cannot be reached by hand. Also, the trigger being distal from the load makes it difficult to unhook the carabiner from the object above, because the connector is connected through the trigger.

Other carabiners, including those disclosed in U.S. Pat. Nos. 1,576,352 and 1,010,952, also do not solve the problems that arise with patient carrying devices.

SUMMARY OF THE INVENTION

Therefore, what is required is a carabiner or similar attachment device which can be efficiently connected to a patient-carrying track at a point that may not be reachable by hand, and can also be easily disconnected from the track conveniently. The carabiner should meet the safety requirements associated with carabiners used with patient-carrying devices. The invention also preferably includes a connection tool for connecting the carabiner to the patient-carrying device.

Therefore, according to one aspect of the invention, there is provided a carabiner for bearing a load and for anchoring the load to an object, the carabiner comprising:
  a body having an internal space, the body having an opening for admitting the object to the internal space and for withdrawing the object from the internal space, the body being sized, shaped and positioned to bear the load and to anchor to an object;
  a closure movably coupled to the body, the closure being movable to an open position, and to a closed position in which the opening is closed by the closure such that the body and the closure define a closed shape;
  an actuator, coupled to the closure and operatively connected to the body, the actuator being configured to cause the closure to move to the closed position in response to loading of the carabiner, and to cause the closure to move from the closed position to the open position in response to unloading of the carabiner.

Preferably, the actuator includes a biasing element, coupled to the closure, for urging the closure to said fully open position. Preferably, the actuator further comprises a trigger coupled to the closure and to the body, the trigger being sized, shaped and positioned to move the closure to the closed position in response to loading of the carabiner. Preferably, the trigger and biasing element are sized, shaped, and positioned to move the closure to the closed position in response to loading of the carabiner by overcoming the urging of the biasing element. Preferably, the biasing element is operatively connected to the trigger, and the trigger is operatively connected to the closure. Preferably, the biasing element comprises one or more springs bearing on the body and on the trigger. Preferably, the trigger is sized, shaped and positioned such that the trigger moves in response to the loading of the carabiner, and said movement of the trigger causes the closure to move to the closed position; Preferably, the closure is rotatably mounted to the body. Preferably, the closure and actuator are sized, shaped and positioned so that the closure rotates in response to an actuator movement. Preferably, the biasing element is sized, shaped and positioned to be unidirectional, whereby the biasing element urges the closure toward the open position and not toward the closed position. Preferably, the carabiner further includes an axle mounted to the body, and wherein the closure is rotatably mounted on the axle. Preferably, the springs and trigger are sized, shaped and positioned so that the springs are compressed when the closure is in the closed position. Preferably, the springs and trigger are sized, shaped and positioned so that the springs are compressed when the carabiner is bearing the load. Preferably, the actuator is positioned on the carabiner proximal to the load. Preferably, the carabiner includes a closure holder, the closure and closure holder being sized, shaped and mutually positioned such that the closure holder releasably holds the closure in the closed position. Preferably, the trigger includes a connector receiver for receiving a connector for use in connecting the carabiner to the patient. Preferably, the connector receiver comprises a slot in said trigger. Preferably, the slot is configured to receive a strap acting as the connector. Preferably, the body includes a connector access for permitting access to the connector receiver.

According to another aspect of the invention, there is provided a connection tool for connecting to an object a carabiner that has an internal space and a carabiner opening for admitting the object to the internal space, the tool comprising:

a support structure having a support opening sized and shaped to permit the carabiner to be received and supported by the support structure and withdrawn from the support structure, the support structure being sized and shaped to hold the carabiner while leaving the carabiner opening unobstructed such that the object can be admitted to the internal space through the carabiner opening;

a handle connected to the support structure, whereby the carabiner can be connected to or disconnected from an object not reachable by hand using the tool.

Preferably, the handle is length-adjustable. Preferably, the length-adjustable handle is telescopically extendible and contractable. Preferably, the handle further includes a stopper for selectively fixing the length of the handle. Preferably, the stopper comprises a threaded ring tightener. Preferably, the support structure includes a connector opening therein for receiving a connector depending from the carabiner, whereby a strap or other connector depending from the carabiner fits in the connector opening and thus does not interfere with the connection and disconnection of the carabiner using the tool. Preferably, the connector opening is contiguous with the insertion opening. In another aspect of the invention, there is provided a method of loading a patient onto an overhead patient-carrying device, the method comprising the steps of:

connecting a carabiner to the overhead patient carrying device using the connection tool;

withdrawing said tool from said carabiner such that the carabiner remains connected to the patient-carrying device;

attaching a patient to the carabiner.

BRIEF DESCRIPTION OF THE DRAWINGS

The invention will now be illustrated by way of example only, in the attached drawings, which show the preferred embodiment of the invention, and in which:

FIG. 6 is a perspective view of the connection tool according to the present invention;

FIG. 7 is a second perspective view of the connection tool according to the present invention;

FIG. 8 is a close-up perspective view of a top portion of the connection tool according to the present invention;

FIG. 10 is a side elevation view of a support structure

FIG. 11 is a cross-section view along live. 11-11 of FIG. 10; and

DETAILED DESCRIPTION OF THE PREFERRED EMBODIMENTS

Figure 1:
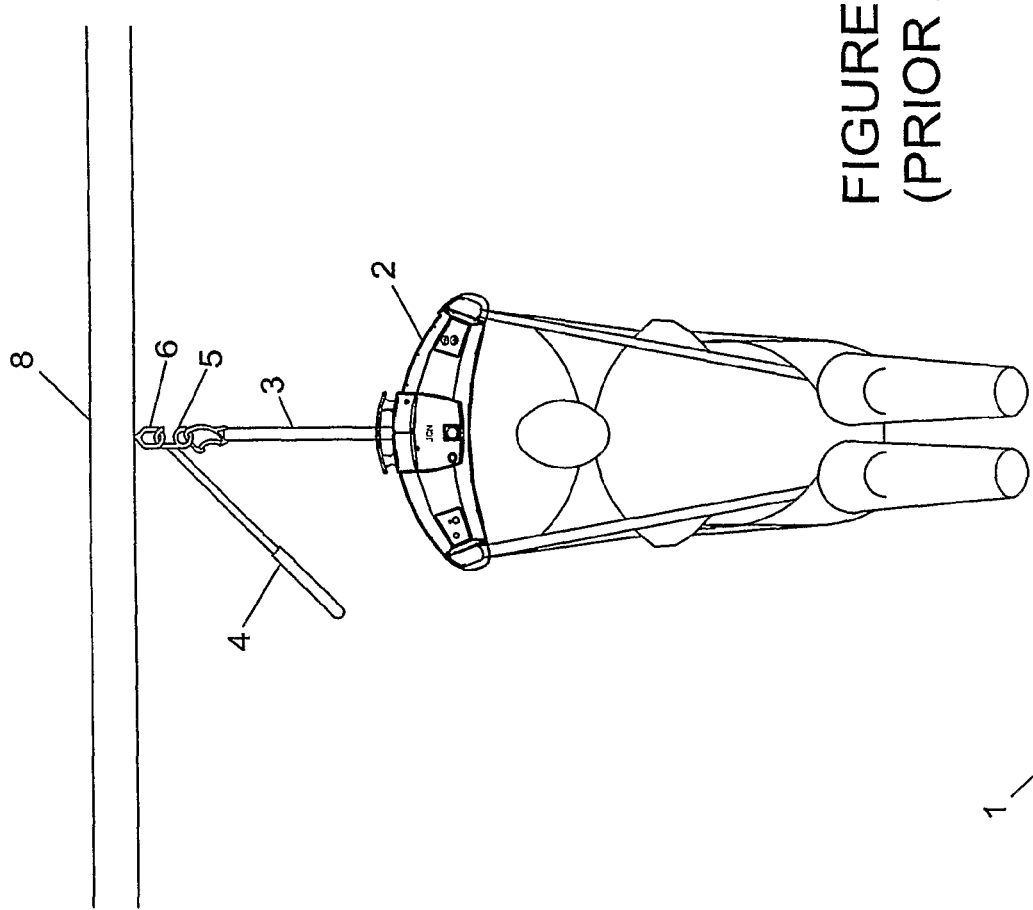
FIG. 1 is an elevation view of a prior art attachment device for use with a patient-carrying device.
Figure 3:
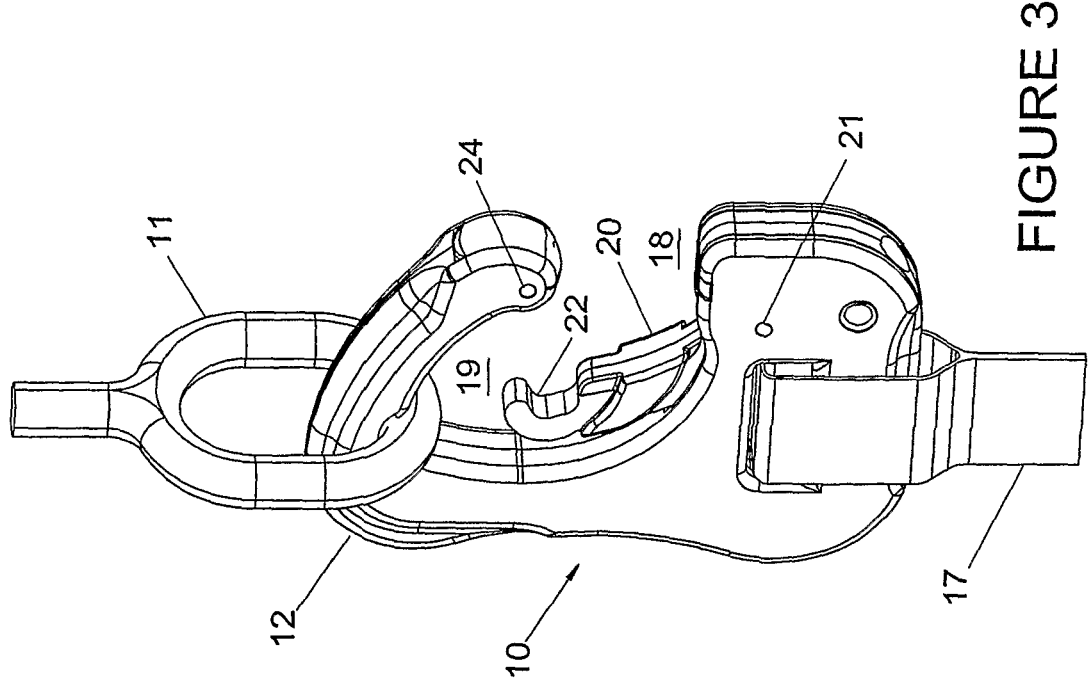
FIG. 3 is a second perspective view of the carabiner according to the present invention.
Figure 2:
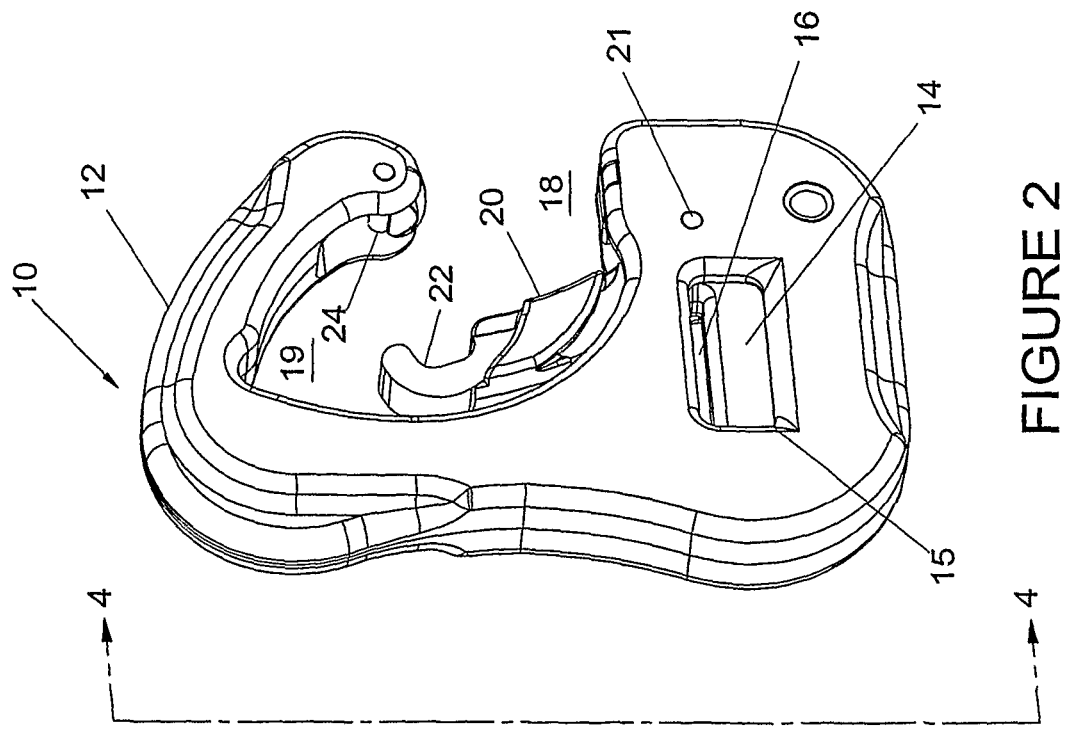
FIG. 2 is a perspective view of the carabiner according to the present invention.
Figure 4:
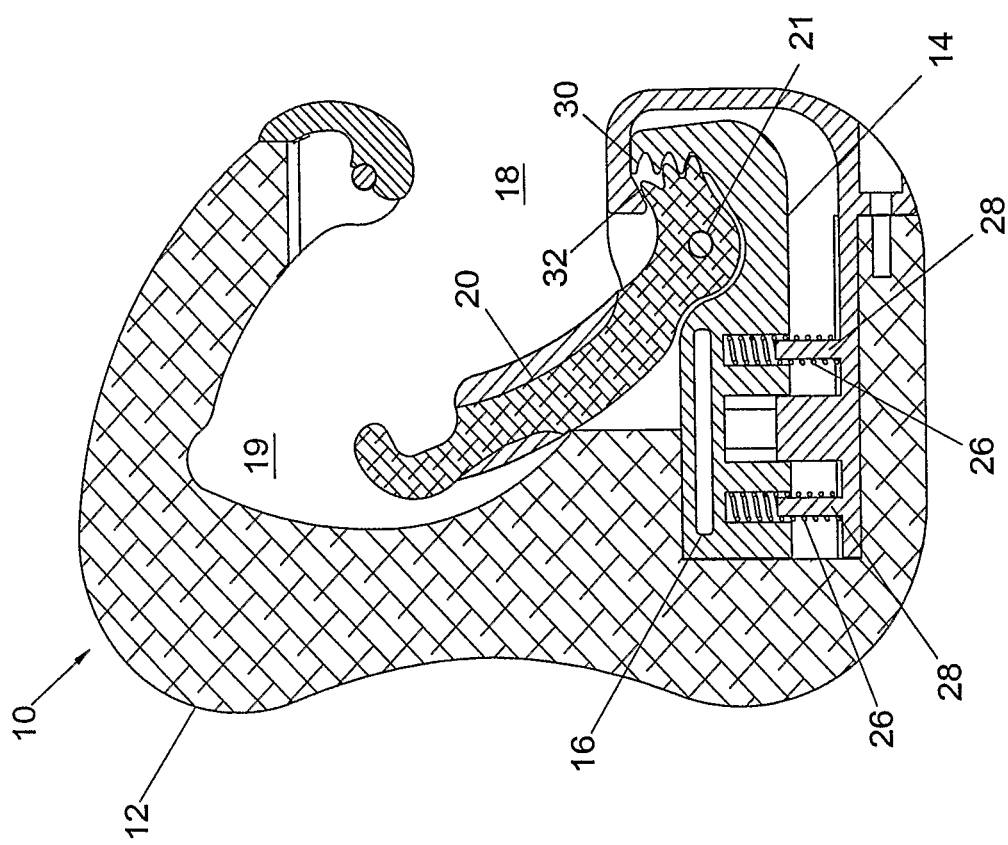
FIG. 4 is a cross-sectional view of the carabiner taken along line 4-4 of FIG. 3.
Figure 5:
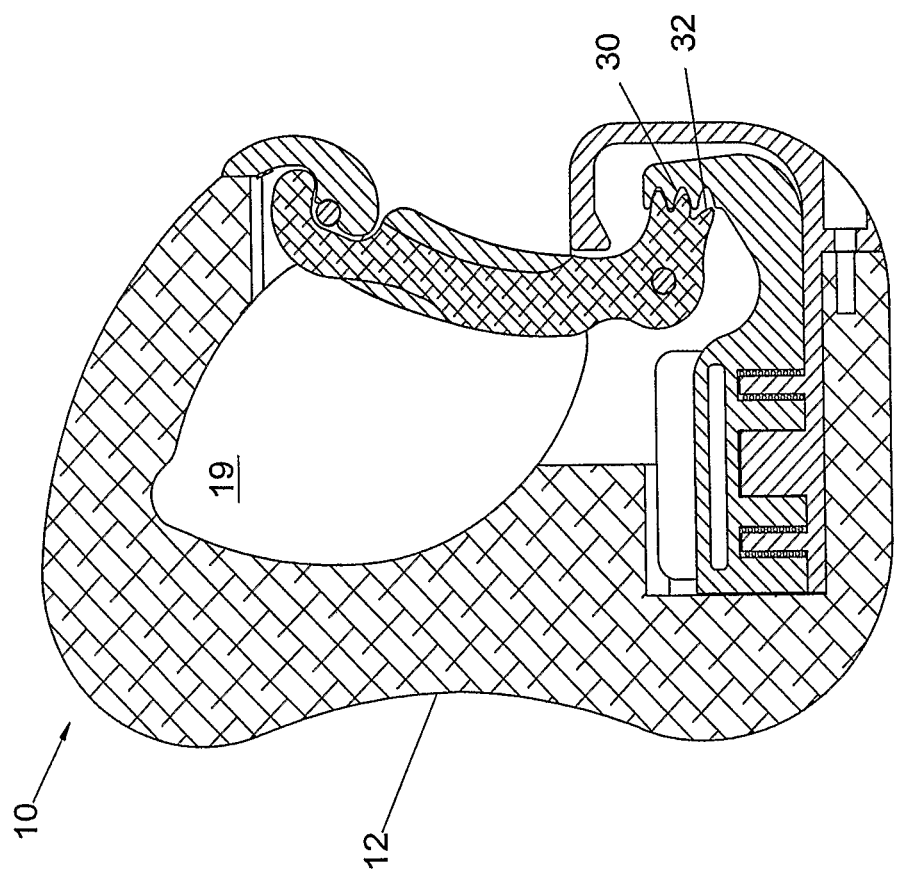
FIG. 5 is the same cross-sectional view of the carabiner as FIG. 4, but shows the closure in the closed position.
Figure 9:
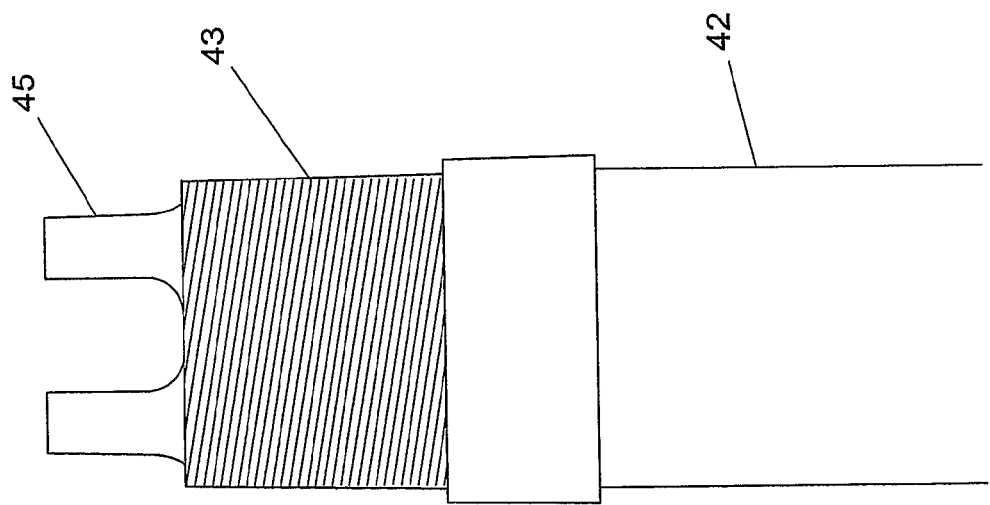
FIG. 9 is a close-up plan view of a portion of the connector tool's handle.
Figure 12:
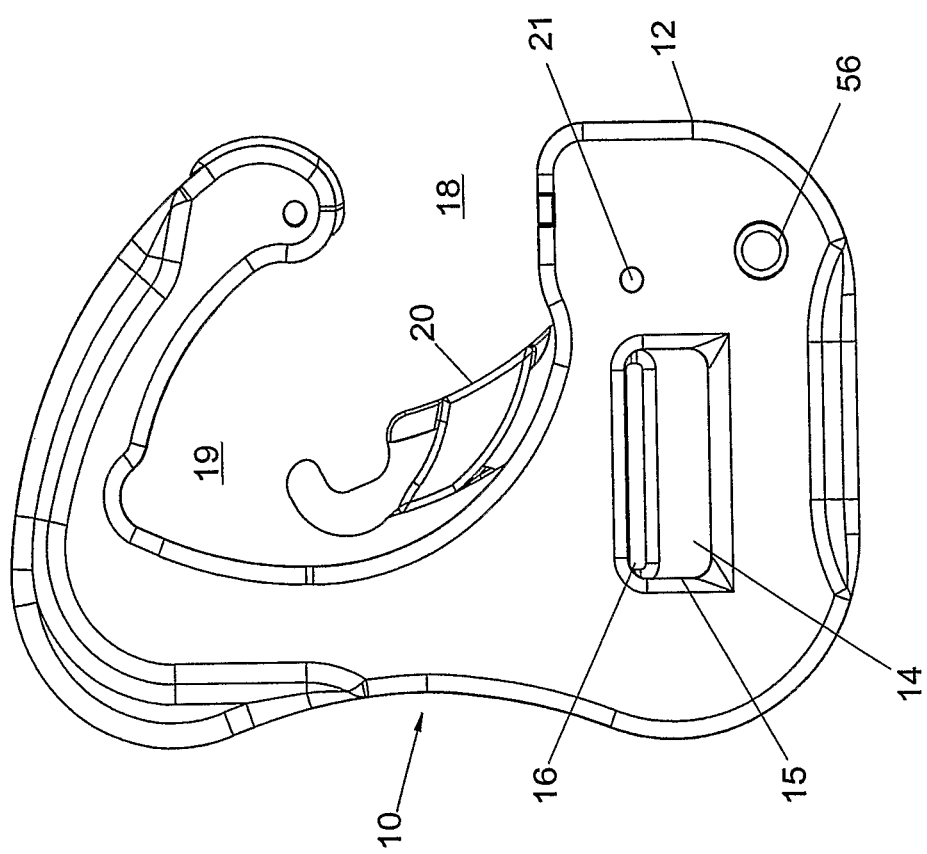
FIG. 12 is a side elevation view of the carbiner.

Referring now to FIG. 1, a prior art configuration of a device for carrying a patient across a floor 1 is shown. The patient-carrying device shown in FIG. 1 includes a harness 2 for holding a patient (not shown) as the patient is transported across the floor. The harness 2 is connected to the eye-bolt 6 via the strap 3, which is hooked onto the hook 5, which hook is hooked to the eye-bolt 6. Eye-bolt 6 is attached to a trolley (not shown) positioned within the track 8. As the eye-bolt 6 is often not reachable by hand because of its height, the handle or reaching arm 4, which is fixed to the hook 5, is used to hook the hook 5 onto the eye-bolt 6. The reaching arm 4, being fixed to the hook, remains in place while the patient-carrying device is used to move the patient from one location on to another.

The eye-bolt 6 is attached to the trolley which can move in either of two directions along the overhead track 8. The track 8 is supported in its raised position by a support frame (not shown).

The hook 5 is an open hook, i.e. it does not define a closed shape. This permits the hook 5 to be hooked and unhooked from the eye-bolt 6 using the reaching arm 4.

Referring now to FIGS. 2-5, a carabiner 10 for bearing a load, and for anchoring the load to an object, is shown. The object preferably takes the form of loop 11, which connects the carabiner to a patient-carrying device (not shown). It will be appreciated that the invention comprehends other types of objects besides the loop 11. For example, the object may comprise an eye-bolt. What is important is that the carabiner can anchor the load to the object. The carabiner 10 includes a body 12 which is sized, shaped and positioned to bear the load and anchor to an object. The carabiner 10 further includes a trigger 14 having a connector receiver in the form of slot 16, formed in the trigger 14, for receiving a connector in the form of the strap 17 shown in dotted outline in FIG. 3. It will be appreciated that the strap 17 functions to connect a patient harness (not shown) to the carabiner 10.

The trigger 14 is movably coupled to the body 12, as well as to the closure 20, which closure, in the preferred embodiment, takes the form of an elongate element rotatably mounted to the body 12 by means of the axle 21. The axle 21 is mounted to and extends through both the body 12 and the closure 20 so that the closure is rotatably mounted to the axle 21 and to the body 12. The closure 20 is sized, shaped, and positioned to leave open the opening 18 in the body 12 when in its open position, and to close the opening 18 when in the closed position. The opening 18 functions to admit an object into the internal space 19 of the carabiner 10, and in particular, of the body 12. It will be appreciated that, in its preferred use, the carabiner 10 anchors to an object, such as a strap loop 11 depending from a trolley mounted to the overhead rail of a portable patient-carrying device. It will be appreciated, however, that the carabiner 10 may be used with other types of patient-carrying devices, or with other types of loads besides patients, and still be comprehended by the invention.

This anchoring preferably takes place by the loop 11 being admitted through the opening 18 into the internal space 19. In turn, the patient harness is connected to the carabiner 10 by means of the strap 17 received within the slot 16. The slot 16 and the trigger 14 are sized, shaped, and positioned to line the slot 16 up with the connector access 15 formed within the body 12. It will be appreciated that the connector access 15 provides access for the connector that connects the carabiner and the patient harness. In the preferred embodiment, this connector comprises the strap 17, but it will be appreciated that the invention comprehends other types of connectors, connector receivers, and connector accesses which take forms other than the preferred forms herein described.

The closure 20 most preferably further includes a latch 22 sized, shaped, and positioned so that when the closure 20 moves to the closed position, the latch 22 is releasably held within the closure holder, which takes the form of notch 24 in the body 12. Notch 24 is most preferably positioned adjacent to the opening 18. The latch 22 most preferably takes the form of an elongate member extending across the width of the closure 20 that is sized, shaped, and positioned to be releasably gripped by the notch 24 in the closed position. It will be appreciated that the invention comprehends configurations for the closure 20 without the latch 22, and configurations of the carabiner 10 that do not include the preferred notch 24 for gripping the latch. What is important is that the closure 20 be movable to a closed position, and, preferably, that the carabiner 10 include a closure holder that is sized, shaped, and mutually positioned with the closure such that the closure holder releasably holds the closure in the closed position.

The trigger 14 is preferably positioned within the body 12 and coupled thereto, so that the slot 16 lines up with the access 15. As can be seen most clearly in FIGS. 4 and 5, the trigger 14 is mounted within the body and is coupled to a biasing element that preferably takes the form of one or more springs 26, and most preferably two springs 26, operatively connected to the trigger 14. The springs 26 preferably comprise coil springs coiled around spring support shafts 28, the springs 26 being operatively connected to the body 12. Preferably, the springs 26 bear against the body 12 to bear against and exert a force on the trigger 14.

The trigger 14 is operatively connected to the closure 20, preferably by means of the trigger teeth 30 of the trigger 14 mated with closure teeth 32 of the closure 20. Thus, as the trigger 14 moves, the trigger teeth 30 bear on the closure teeth 32, thus moving the closure 20, by rotating it about the axle 21. In the preferred embodied shown in FIGS. 2-5, the springs 26, the trigger 14, and the closure 20 are sized, shaped, and positioned so that the closure is biased to an open position. Thus, the springs 26 are coupled to the body 12, preferably indirectly via the trigger 14. Then, as the trigger 14 is moved so as to compress the springs 26, the closure 20 is rotated to the closed position.

It will be appreciated that the invention comprehends other ways of coupling of the trigger 14 to the closure 20 besides the preferred teeth described above. For example, the coupling could be accomplished by a rivet coupling the trigger and the closure. The invention also comprehends a configuration wherein the trigger 14 causes the movement of the closure 20 without movement of the trigger 14 itself.

It will also be appreciated that the trigger 14 and biasing element need not take the preferred form described herein. Other forms are comprehended by the invention. For example, the trigger 14 can be formed with the closure 20 in a single piece. The biasing element may take the form of one or more springs, which may be integral with the trigger or the closure. Alternatively, the biasing element could take more complex forms, such as, for example, an electronic sensor that causes a pneumatic system to hold the closure open unless a load is sensed, in which case, the closure is caused to close. It will be appreciated that such a biasing element configuration is not preferred, because it is more expensive and complex than the preferred form described herein. What is important is that the closure close in response to carabiner load and open in response to carabiner unloading.

In operation, the strap 17 is threaded through the slot 16 and emerges on both sides of the body 12 from the connector access 15. When the patient is connected to the strap 17, or the carabiner is otherwise loaded, the strap 17 forces the trigger 14 to move (preferably downward), so as to compress the springs 26. As the trigger 14 moves, the trigger teeth 30 act on the closure teeth 32 to cause the closure 20 to rotate to the closed position. Thus, the closure is moved to the closed position in response to loading of the carabiner 10. The springs 26 are compressed when the closure is in the closed position and the carabiner 10 is loaded. When the carabiner 10 is unloaded, the springs 26 expand because the load is no longer forcing them to compress. The trigger 14 moves (preferably upward) because of the force of the springs 26, and by means of the teeth 30, 32, the closure is rotated to the open position. Thus, in response to the unloading of the carabiner 10, the closure 20 is moved from the closed position to the open position. The springs 26 function to bias the closure 20 to the open position.

It will be appreciated that the trigger 14 and biasing element (preferably in the form of springs 26) function together as an actuator configured to cause the closure 20 to move to the closed position in response to the loading of the carabiner 10, and to cause the closure 20 to move from the open position to the closed position in response to the carabiner being unloaded. The actuator, therefore, preferably comprises a biasing element, preferably coupled to the closure 20 and to the body 12, for urging the closure to the fully open position, and a trigger 14, preferably coupled to the closure and to the body, which trigger is preferably sized, shaped and positioned to move the closure to the closed position in response to loading of the carabiner.

It will be appreciated that the "closed position" is the position of the closure in which the object (preferably the loop depending from the trolley) cannot be withdrawn via the opening 18 from the internal space 19 of the body 12. The "open position" comprises the range of positions of the closure 20, which permit the object (preferably the loop) to be withdrawn via the opening 18 from the internal space 19 of the body 12.

It will also be appreciated that the biasing element is preferably configured to be unidirectional, i.e. it biases the closure in the direction of the open position, and not in the direction of the closed position. This configuration is to be contrasted with bi-directional biasing elements, including those that bias the closure 20 to an open position when the closure 20 is in some positions within its range of motion, and to a closed position when the closure 20 is at other positions. Thus, in the preferred embodiment, the unidirectional biasing element urges the closure 20 to the open position, including when the closure 20 is in the closed position.

Preferably, the actuator is positioned proximal to rather than distal from the load. Thus, in the case of the carabiner 10 used to anchor a patient to a patient-carrying device, the load is positioned below the carabiner 10. The actuator is preferably positioned at the bottom of the body 12 rather than the top, i.e., proximal to the load rather than distal from it.

It will be appreciated that the actuator need not take the preferred form of the trigger and biasing element. The invention comprehends other forms for the actuator. For example, the actuator could comprise an electromechanical device that closes the closure 20 in the response to a load and opens it in response to unloading.

Referring now to FIGS. 6-12, a preferred form of the connector tool 33 is shown. The connector tool includes a support structure 34 having an insertion opening 35 sized and shaped to permit the insertion and withdrawal from the support structure of a carabiner 10 that has an internal space 19, as well as a carabiner opening 18 for admitting to the internal space an object to be connected to the carabiner. The support structure 34 is also sized and shaped to hold the carabiner 10 within the support structure after insertion while leaving the carabiner opening 18 unobstructed, so that the object (not shown) can be admitted to the internal space. The preferred support structure 34 is sized and shaped to receive and support the preferred carabiner 10, though the invention comprehends that the support structure 34 can be sized and shaped for use with any carabiner that can be anchored to an object.

The preferred support structure 34 includes two support walls 36, 38, and a support floor 39, which support a carabiner inserted therein from the rear (i.e. against the portion of the body opposite the opening), as well as from underneath and from the sides of the bottom half of the carabiner. However, it will be appreciated that the support structure is sized and shaped so that when the carabiner 10 is contained within the support structure 34, the carabiner opening 18 is accessible so as to permit an object to be hooked or anchored into the carabiner 10 via the carabiner opening 18.

The tool 33 further preferably includes a telescopically extendible handle comprising two handle portions 42, 46. In the preferred embodiment, the portion 46 fits telescopically within the portion 42. The handle is thus extendible by partially extracting portion 46 from portion 42, and contractable by inserting portion 46 further into portion 42.

The tool 33 further preferably includes a stopper in the form of a threaded tightening ring 44 for releasably fixing the length of the handle. In the preferred embodiment, the threaded ring 44 is mounted to a compressible threaded end portion 45 of the portion 42. The portion 43 has threading 43. When the ring 44 is tightened, the end portion 45 compresses against the portion 46, so that the portions 46 and 42 are held stationary relative to one another, and the length of the handle is fixed until the ring 44 is loosened. The ring thus stops the portions 42, 46 from moving relative to one another.

It will be appreciated that, though preferred, the invention comprehends handles that are not length adjustable.

The tool 33 further preferably includes a connector opening 48 therein for receiving a connector depending from the carabiner 10. Preferably, the connector is a strap 17 for connecting the carabiner to a patient harness. Thus, the connector opening 48 preferably takes the form of a slit between the walls 36, 38, and through the floor 39, the slit being sized and shaped to receive a strap 17.

The connector opening 48 functions to receive the connector that connects the carabiner 10 to the patient harness. It will be appreciated that the connector, if not received within the opening 48, could interfere with the carabiner 10 being properly supported within the support structure 34. For example, in the case where the connector takes the form of a strap 17, if the preferred carabiner 10 were inserted into the support structure 34, the strap 17 would bunch up within the support structure, thus interfering with the insertion and support of the carabiner 10 within the support structure. However, the connector opening 48 permits the strap 17 to be received within the opening 48 so that the strap 17 does not bunch within the support structure 34.

Most preferably, the opening 48 is contiguous with the opening 35. It will be appreciated that this permits efficient use of the tool 33 to unhook the carabiner from the loop depending from trolley of the patient-carrying device. Specifically, after the patient has been removed from the harness, the strap 17 depending from the carabiner 10 will be hanging loosely downward. To unhook the carabiner from the loop, a user can take the tool and slide the strap 17 into the opening 48. Then using the strap 17 as a guide, the user can move the tool 33 upward until the carabiner enters the support structure 34 through the opening 35. Because the strap 17 was received through the slit 48, the strap does not interfere with the carabiner 10 entering the support structure 34 through the opening 35 and being supported within the support structure 34. The tool is then moved slightly higher still, and then moved sideways, to unhook the carabiner from the loop by having the loop exit the opening 18 of the carabiner. The tool 33 can then be withdrawn so that the user can remove the carabiner from the support structure 34 (e.g. by hand).

It will be appreciated that the support structure 34 can have a different configuration than the preferred configuration described above, while still being comprehended by the invention. For example, the structure 34 could comprise a magnet that attracts a magnet on the underside of the carabiner 10. The support opening 35 would, in this case, comprise the open space adjacent the magnet that permits access by the carabiner magnet. What is important is that the support structure be configured to hold the carabiner while leaving the carabiner opening unobstructed.

Although not required, the tool 33 preferably includes a supplementary holder. Most preferably, the holder takes the form of two grippers 50, one flexibly mounted to each wall 36, 38. The grippers 50 each preferably comprise an arm 52 flexibly attached to the wall (36, 38) with a protrusion 54 depending from the arm.

Preferably, the carabiner 10 includes two cavities 56 positioned one on each side of the carabiner 10 so as to line up with the protrusions 54 on each wall 36-38 when the carabiner is inserted fully into the structure 34. As the carabiner 10 is inserted into the structure 34, the protrusions 54 contact the carabiner and the arms are flexed outward away from the carabiner 10. When insertion is completed, the protrusions 54 line up with the cavities 56 and the arms flex back toward the carabiner 10 with the protrusions 54 entering the cavities 56 so as to removably hold the carabiner 10 in the structure 34. The protrusions 54 and cavities 56 are sized, shaped, and positioned so that when force is applied by the human arm to remove the carabiner 10 from the structure 34, the protrusions pop out of the cavities and the carabiner is removed.

It will be appreciated that the invention comprehends other types of supplementary holders. For example, the supplementary holder could comprise a magnet inside the structure 34 that is attracted to a magnet on the carabiner. What is important is that the supplementary holder function to hold the carabiner more firmly (yet still removably) within the carabiner.

While the foregoing embodiments of the present invention have been set forth in considerable detail, it will be apparent to those skilled in the art that various modifications can be made to the invention without departing from the scope of the attached claims. Some of these variations are discussed above and others will be apparent to those skilled in the art. For example, the body 12 of the carabiner 10, as well as the actuator, may take forms different from the preferred forms described above, and still be comprehended by the invention.

What is important is that the closure be closed in response to loading of the carabiner 10, and opened in response to unloading of the carabiner 10.

The embodiments of the invention in which an exclusive property or privilege is claimed are defined as follows:

1. A carabiner for bearing a load and for anchoring the load to an object, the carabiner comprising:
    a body having an internal space, the body having an opening for admitting the object to the internal space and for withdrawing the object from the internal space, the body being sized, shaped and positioned to bear the load and to anchor to an object;
    a closure movably coupled to the body, the closure being movable to an open position, and to a closed position in which the opening is closed by the closure such that the body and the closure define a closed shape;
    an actuator, coupled to the closure and operatively connected to the body, the actuator being configured to cause the closure to move to the closed position in response to loading of the carabiner, and to cause the closure to move from the closed position to the open position in response to unloading of the carabiner.

2. A carabiner as claimed in claim 1, wherein the actuator includes a biasing element, coupled to the closure, for urging the closure to said fully open position.

3. A carabiner as claimed in claim 2, wherein the actuator further comprises a trigger coupled to the closure and to the body, the trigger being sized, shaped and positioned to move the closure to the closed position in response to loading of the carabiner.

4. A carabiner as claimed in claim 3, wherein the trigger and biasing element are sized, shaped, and positioned to move the closure to the closed position in response to loading of the carabiner by overcoming the urging of the biasing element.

5. A carabiner as claimed in claim 4, wherein the biasing element is operatively connected to the trigger, and the trigger is operatively connected to the closure.

6. A carabiner as claimed in claim 3, wherein the biasing element comprises one or more springs bearing on the body and on the trigger.

7. A carabiner as claimed in claim 6, wherein the springs and trigger are sized, shaped and positioned so that the springs are compressed when the closure is in the closed position.

8. A carabiner as claimed in claim 6, wherein the springs and trigger are sized, shaped and positioned so that the springs are compressed when the carabiner is bearing the load.

9. A carabiner as claimed in claim 3, wherein the trigger is sized, shaped and positioned such that the trigger moves in response to the loading of the carabiner, and said movement of the trigger causes the closure to move to the closed position.

10. A carabiner as claimed in claim 3, wherein the trigger includes a connector receiver for receiving a connector for use in connecting the carabiner to the patient.

11. A carabiner as claimed in claim 10, wherein the connector receiver comprises a slot in said trigger.

12. A carabiner as claimed in claim 11, wherein said slot is configured to receive a strap acting as said connector.

13. A carabiner as claimed in claim 11, wherein said body includes a connector access for permitting access to said connector receiver.

14. A carabiner as claimed in claim 2, wherein the biasing element is sized, shaped and positioned to be unidirectional, whereby the biasing element urges the closure toward the open position and not toward the closed position.

15. A carabiner as claimed in claim 1, wherein the closure is rotatably mounted to the body.

16. A carabiner as claimed in claim 15, wherein the closure and actuator are sized, shaped and positioned so that the closure rotates in response to an actuator movement.

17. The carabiner as claimed in claim 15, wherein the carabiner further includes an axle mounted to the body, and wherein the closure is rotatably mounted on the axle.

18. A carabiner as claimed in claim 1, wherein the actuator is positioned on the carabiner proximal to the load.

19. A carabiner as claimed in claim 1, wherein the carabiner includes a closure holder, the closure and closure holder being sized, shaped and mutually positioned such that the closure holder releasably holds the closure in the closed position.

* * * * *